United States Patent
Lambert et al.

(10) Patent No.: US 10,331,593 B2
(45) Date of Patent: Jun. 25, 2019

(54) SYSTEM AND METHOD FOR ARBITRATION AND RECOVERY OF SPD INTERFACES IN AN INFORMATION HANDLING SYSTEM

(71) Applicant: DELL PRODUCTS, LP, Round Rock, TX (US)

(72) Inventors: Timothy M. Lambert, Austin, TX (US); Jeffrey L. Kennedy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 246 days.

(21) Appl. No.: 15/486,685

(22) Filed: Apr. 13, 2017

(65) Prior Publication Data

US 2018/0300273 A1   Oct. 18, 2018

(51) Int. Cl.
*G06F 13/364* (2006.01)
*G06F 13/40* (2006.01)
*G06F 13/42* (2006.01)

(52) U.S. Cl.
CPC ........ *G06F 13/364* (2013.01); *G06F 13/4022* (2013.01); *G06F 13/4282* (2013.01)

(58) Field of Classification Search
CPC .......................... G06F 13/364; G06F 13/4022; G06F 13/4282
See application file for complete search history.

(56) References Cited

U.S. PATENT DOCUMENTS

| | | | |
|---|---|---|---|
| 8,954,619 B1* | 2/2015 | DeCesaris | G11C 14/0045 710/15 |
| 2002/0083368 A1* | 6/2002 | Abe | G06F 1/30 714/24 |
| 2006/0206673 A1* | 9/2006 | Lu | G06F 13/4243 711/154 |
| 2012/0096255 A1 | 4/2012 | Zhang | |
| 2013/0289909 A1 | 10/2013 | Lin | |
| 2014/0025851 A1* | 1/2014 | DeCesaris | G06F 13/385 710/110 |

* cited by examiner

*Primary Examiner* — Eric T Oberly
(74) *Attorney, Agent, or Firm* — Larson Newman, LLP

(57) ABSTRACT

An information handling system includes a DIMM including a SPD and a slave I2C interface, a processor complex including a first master I2C interface selectively coupled to the slave I2C interface during a system boot state, a BMC including a second master I2C interface selectively coupled to the slave I2C interface during a power-off state, and reset logic configured to select the first master I2C interface to be coupled to the slave I2C interface during the system boot state, select the second master I2C interface to be coupled to the slave I2C interface during the power-off state, detect a transition between the power-off state and the system boot state, and delay the selection of the first master I2C interface to be coupled to the slave I2C interface until the BMC is finished communicating with the SPD.

20 Claims, 4 Drawing Sheets

SYSTEM AND METHOD FOR ARBITRATION AND RECOVERY OF SPD INTERFACES IN AN INFORMATION HANDLING SYSTEM

FIELD OF THE DISCLOSURE

This disclosure generally relates to information handling systems, and more particularly relates to arbitration and recovery of Serial Presence Detect (SPD) interfaces in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a DIMM having an SPD and a slave I2C interface, a processor complex including a first master I2C interface selectively coupled to the slave I2C interface during a system boot state, a BMC including a second master I2C interface selectively coupled to the slave I2C interface during a power-off state, and reset logic configured to select the first master I2C interface to be coupled to the slave I2C interface during the system boot state, select the second master I2C interface to be coupled to the slave I2C interface during the power-off state, detect a transition between the power-off state and the system boot state, and delay the selection of the first master I2C interface to be coupled to the slave I2C interface until the BMC is finished communicating with the SPD.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
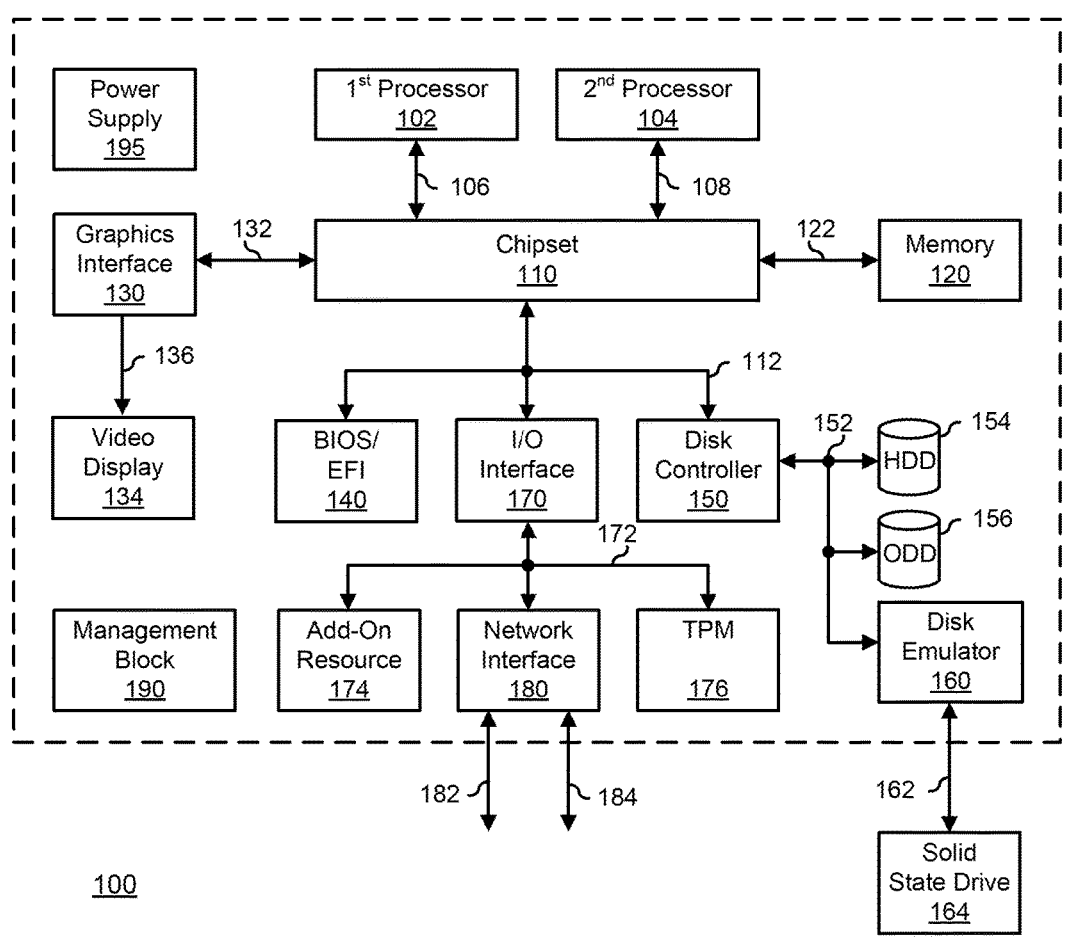
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
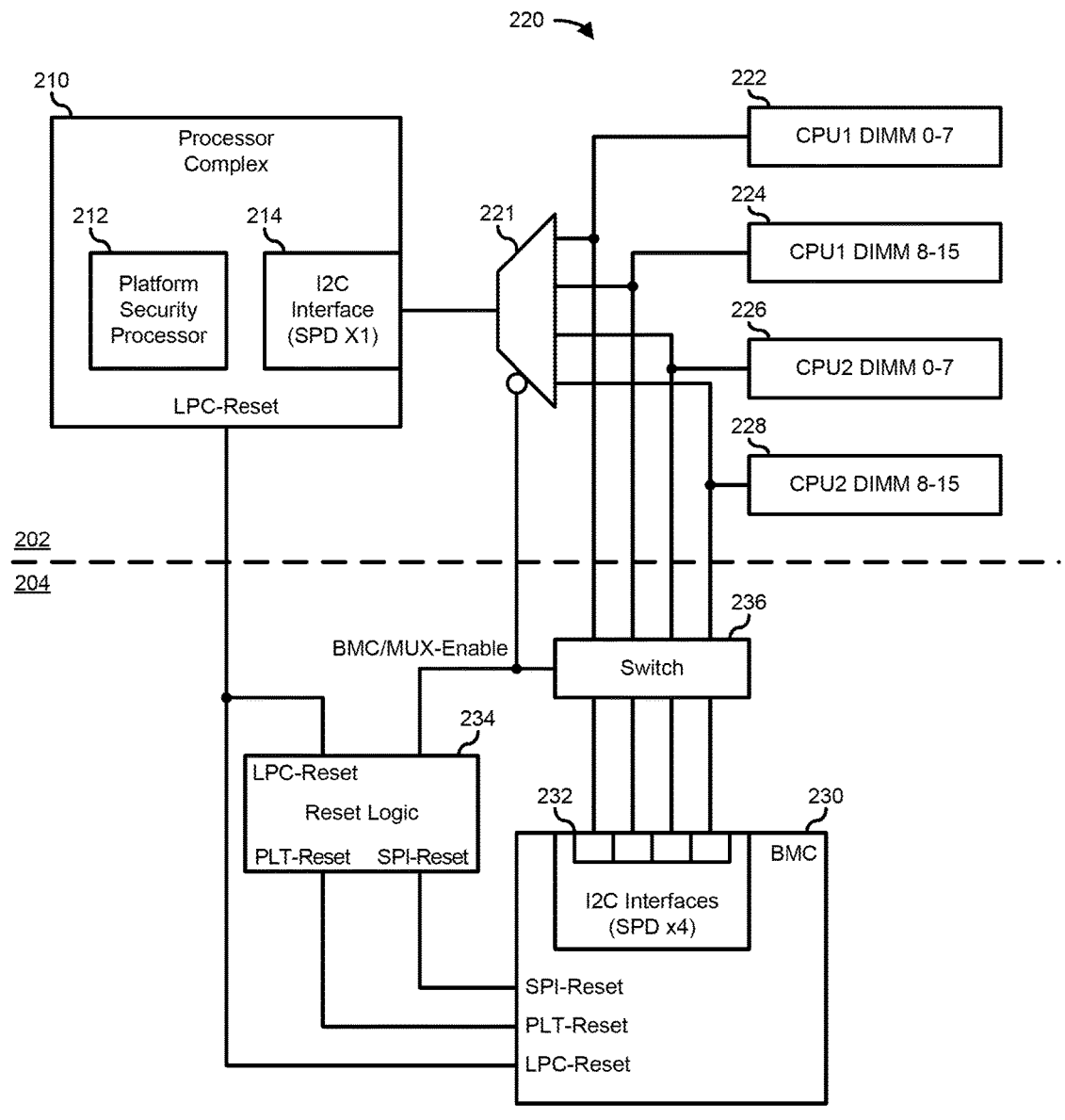
FIG. 2 is a block diagram illustrating an information handling system according to an embodiment of the present disclosure.

FIG. 2 illustrates an information handling system 200 including a host environment 202 and a management block 204. Host environment 202 includes a processor complex 210 and Dual In-Line Memory Module (DIMM) management interface 220. DIMM management interface 220 includes a processor complex/DIMM management interface multiplexor 221 (hereinafter "multiplexor 221"), and DIMM banks 222, 224, 226, and 228. Processor complex 210 includes a platform security processor (PSP) 212 and an Inter-Integrated Circuit (I2C) interface 214. Management block 204 includes a BMC 230, information handling system reset logic 234 (hereinafter "reset logic 234"), and a BMC/DIMM management interface switch 236 (hereinafter "switch 236"). BMC 230 includes I2C interfaces 232. Not that, as illustrated, I2C interface 214 represents a single SPD interface, but this is not necessarily so. In particular, in other architectures for processor complex 210, instead of I2C interface 214, a processor complex may include a Host Memory Controller (HMC) that provides multiple SPD interfaces to each of DIMM banks 222, 224, 226, and 228, as needed or desired.

Host environment 202 operates to provide data processing functionality of information handling system 200, such as is typically associated with an information handling system. As such, processor complex 210 represents a data processing apparatus, such as one or more central processing units (CPUs) or processor cores, and the associated data input and output I/O functionality, such as a chipset component, and other I/O processor components. Processor complex 210 operates to execute machine-executable code to perform the data processing tasks associated with information handling system 200. An example of processor complex 210 includes various processing architectures, such as an x86 architecture as implemented by various Intel or AMD processors.

DIMM management interface 220 provides for communications between processor complex 210 and the serial presence detect (SPD) mechanisms on DIMM banks 222, 224, 226, and 228. In particular, when information handling system 200 undergoes a system boot process, processor complex 210 initializes the DIMMs in DIMM banks 222, 224, 226, and 228. As a part of the system boot process PSP 212 operates to perform portions of the memory reference code (MRC) typically performed by a system BIOS or UEFI, including accessing the SPD mechanisms on each DIMM to determine memory device timing parameters, to detect and select various DIMM parameters, to override the SPD information on the DIMMs, to provide error correcting code (ECC) data for the DIMMs, or the like. The details of the system boot process related to memory initialization, MRC, and accessing and utilizing the SPD mechanisms are known in the art, are beyond the scope of the present disclosure, and will not be further elaborated on herein except as needed for the understanding of the present disclosure.

When PSP 212 or other elements of processor complex 210 need to access the SPD mechanisms on the DIMMs, the PSP or other elements access the SPD mechanism via a single I2C interface that is connected to multiplexor 221. Multiplexor 221 selects a particular DIMM bank 222, 224, 226, or 228 based upon the location of the particular DIMM that is being accessed. The I2C interface is a bus-based interface that interconnects eight slave I2C interfaces, on each DIMM in DIMM banks 222, 224, 226, and 228, and each DIMM is configured to respond to I2C transactions issued by the I2C master interface, that is, I2C interface 214. The selection of one of DIMM banks 222, 224, 226, and 228 by multiplexor 221 is based upon an selection input (not shown) from processor complex 210. Multiplexor 221 is enabled based when a BMC/MUX-Enable signal from reset logic 234 is in a low state, as described further below.

Management block 204 operates to implement and manage various maintenance, operation, and system update processes for information handling system 200 that are not typically associated with the data processing functionality of information handling system 200. For example, management block 204 may provide for out-of-band management of the various code executed on host environment 202, such as BIOS code or UEFI code, firmware code, programs, applications, operating systems, and the like. In particular, management block 204 can operate on a different power plane than host environment 202, such that the management block can download and store updated code for the host environment, even when the host environment is powered off. Management block 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. The mechanisms and method of system management via a BMC are known in the art and are beyond the scope of the present disclosure. An example of BMC 140 includes a commercially available BMC product that operates in accordance with an Intelligent Platform Management Initiative (IPMI) specification, such as a Integrated Dell Remote Access Controller (iDRAC), or the like.

BMC 230 operates to provide access to DIMM banks 222, 224, 226, and 228 in particular system circumstances via the SPD mechanisms on the DIMMs for pre-power-on system hardware inventory, for temperature polling, for ECC error logging, and during reset prior to the deassertion of the LPC-Reset signal from processor complex 210, as described further below. When BMC 230 needs to access the SPD mechanisms, the BMC access the SPD mechanisms via a four I2C interfaces 232 that are each connected to respective I2C busses of DIMM banks 222, 224, 226, and 228 via switch 236. Switch 236 operates to switch each of I2C interfaces 232 onto their respective I2C busses of DIMM banks 222, 224, 226, and 228, and, if needed, to switch signal levels between host environment 202 and management block 204. For example, host environment 202 may operate I2C busses from a 2.5 volt power plane, while management block 204 may operate I2C busses from a 3.3 volt power plane. I2C interfaces 232 are connected to the I2C busses of DIMM banks 222, 224, 226, and 228 based upon a high state of the BMC/MUX-Enable signal from resent logic 234, as described further below.

Information handling system 200 operates in various operational states, including a mechanical off state (G3), a soft off state (S5), and a working state (S0). In the G3 state, information handling system 200 is mechanically disconnected from wall power, and all power supplies are shut down. In a particular embodiment, information handling system 200 provides a virtual power cycle that operates to effectively shut down all power supplies of the information handling system without mechanically disconnecting the information handling system from wall power. For the purposes of this disclosure, the G3 state will be understood to include both a mechanically disconnected state and a virtual power cycle state. In the S5 state, information handling system 200 is minimally powered to permit powering on of the information handling system. For example, power can be provided to a power button or to circuitry that provides various wake events, such as Wake-on-LAN, Wake-on-Ring, real time clock-based wake events, and the like.

Typically, in the S5 state, power is provided to management block 204 so that BMC 230 can perform an inventory of the elements of information handling system 200, perform out-of-band management operations, such as downloading BIOS, UEFI, or firmware updates, and the like. In particular, in the S5 state, BMC 230 can access the SPD mechanisms of the DIMMs in DIMM banks 222, 224, 226, and 228 when information handling system 200 is in the S5 state. In the S0 state, information handling system 200 is fully powered, with the power being provided from the various power rails in accordance with the needs of the system boot process, such that, typically by the end of the system boot process, when the BIOS or UEFI passes operations to an operating system (OS), all power rails of the information handling system are powered.

In the transitions from the S5 state to the S0 state, and from the S0 state to the S5 state, contentions between processor complex 210 and BMC 230 for the ownership of the various I2C busses of DIMM banks 222, 224, 226, and 228 can occur, leading to errors in information handling system 200 that may only be correctable by a complete power down to the G3 state. For example, consider that the I2C interface is a master-slave topology, and that once an I2C master has initiated a transaction with the slave I2C, the slave will ignore further transactions until after the prior transaction is completed. As such, in the transition from the S5 state to the S0 state, BMC 230 may have pending system inventory transactions that were initiated by I2C interfaces 232 with DIMM banks 222, 224, 226, or 228. For example, consider the case where one of I2C interfaces 232 issues a command to the SPD mechanism of a DIMM on DIMM bank 222. If processor complex 210 issues a subsequent I2C transaction to read the SPD data from the same DIMM, then, because the DIMM is already processing transactions from BMC 230, the DIMM may ignore the SPD data read from the processor complex. As a result, processor complex 210 may determine that no DIMMs are installed in DIMM bank 222, when in fact the DIMM bank is populated.

Reset logic 234 represents various circuits, controllers, logic, and other elements of information handling system 200 that manage and control the various reset signals throughout the information handling system. In a particular embodiment, on or more of the functions and features of reset logic 234 are performed by a complex programmable logic device (CPLD) associated with management block 204. As shown and described in with respect to FIGS. 3 and 4, below, the illustrated CPLD can be understood to perform the functions and feature of reset logic 234.

Figure 3:
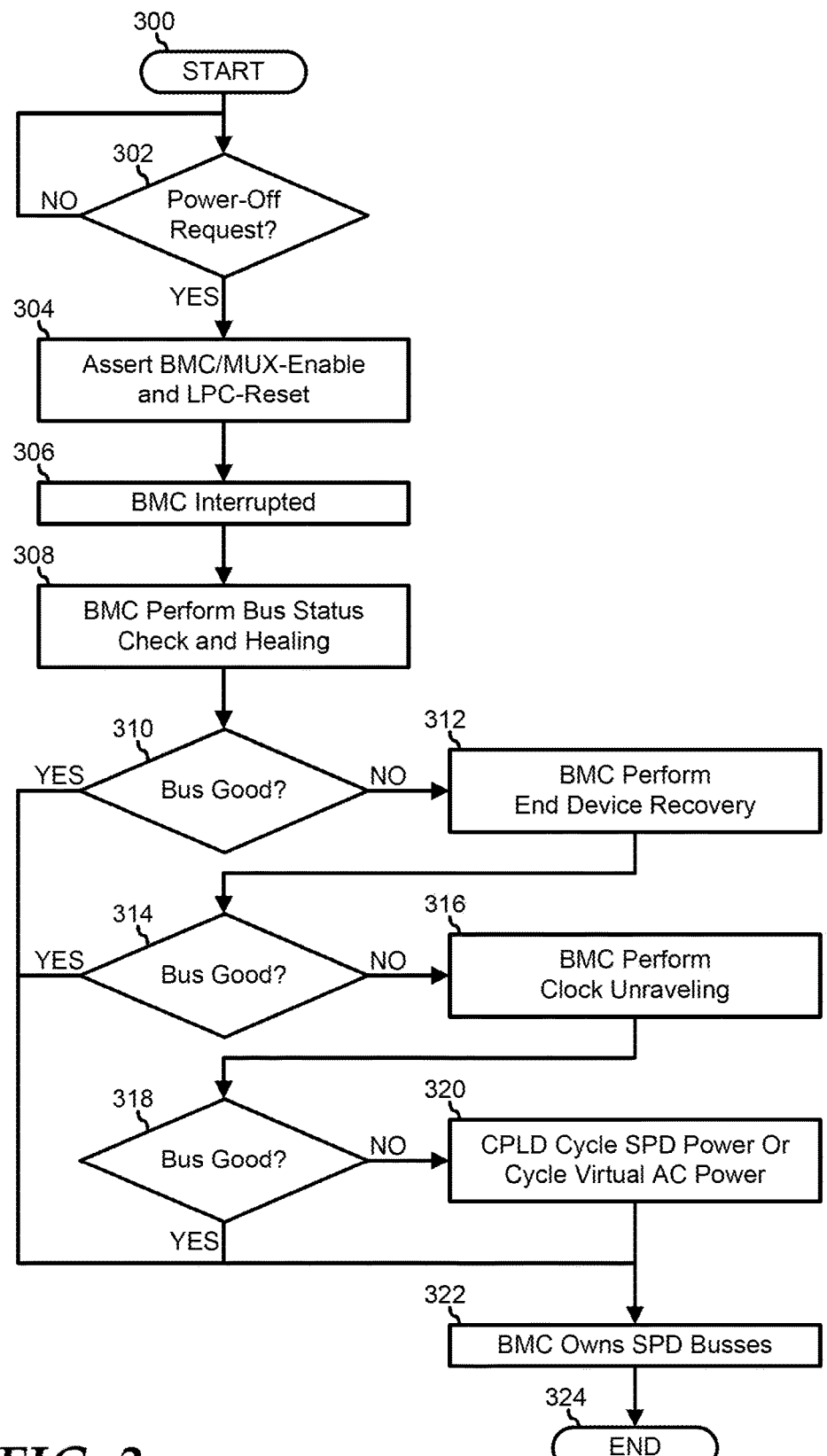
FIG. 3 is a flowchart illustrating a method for arbitration and recovery of serial presence detect (SPD) interfaces when an information handling system transitions from an S0 (working) state to an S5 (soft off) state, according to an embodiment of the present disclosure.

FIG. 3 illustrates a method for arbitration and recovery of SPD interfaces when an information handling system transitions from the S0 state to the S5 state, beginning at block 300. A decision is made as to whether or not an information handling system has had a power off condition in decision block 302. For example, an information handling system can have a power-good signal (PWRGOOD) signal deasserted, or a BIOS, UEFI, or application can request to power off the information handling system. If the information handling system has not had a power off condition, the "NO" branch of decision block 302 is taken, and the method loops back to the decision block until the information handling system has had a power off condition, and the "YES" branch of the decision block is taken, and the method proceeds to block 304. At block 304, a CPLD asserts a BMC/MUX-Enable signal to isolate a processor complex of the information handling system from the SPD mechanisms of the DIMMs and to switch a BMC of the information handling system to the SPD mechanisms, and a processor complex asserts an LPC-Reset signal. The BMC is interrupted based upon the assertion of the LPC-Reset signal in block 306. At this time, based upon the assertion of the BMC/MUX-Enable signal, the BMC owns the I2C busses to the SPD mechanisms of the DIMMs and performs a status check and bus healing in block 308.

A decision is made as to whether or not a particular I2C bus is good in decision block 310. For example, in a first instance, an I2C bus can be determined to be in a good condition if a "Bus Idle" condition is detected, where both a clock and a data signal are at a logic HIGH level. As a further check, a device can be queried with an ACK/NACK (acknowledged/not acknowledged) transaction, where a ACK reply indicates that the I2C bus is in the good condition, and a NACK reply indicates that the I2C bus is not in the good condition. If so, the "YES" branch of decision block 310 is taken and the method proceeds to block 322, as described below. If not, the "NO" branch of decision block 310 is taken and the BMC performs an end-device recovery in block 312, for example, by injecting an SMBUS timeout by holding a clock signal low for longer than 35 ms, and the method proceeds to decision block 314 where the particular I2C bus is rechecked to determine whether or not the particular I2C bus is good. If so, the "YES" branch of decision block 314 is taken and the method proceeds to block 322, as described below. If not, the "NO" branch of decision block 314 is taken and the BMC performs a clock unravelling on the particular bus in block 316, for example by providing 27 clock cycles followed by a stop cycle, and the method proceeds to decision block 318 where the particular I2C bus is rechecked to determine whether or not the particular I2C bus is good. If so, the "YES" branch of decision block 318 is taken and the method proceeds to block 322, as described below. If not, the "NO" branch of decision block 318 is taken and the BMC requests the CPLD to cycle the SPD bus power or to perform a virtual AC Power cycle in block 320, and the method proceeds to block 322. When the particular bus is good, as determined by decision blocks 310, 314, and 318, or when the CPLD cycles the SPD bus power or provides the AC Power cycle in block 320, then the BMC owns the particular SPD bus in block 322 and the method ends in block 324. It will be understood that blocks 310-320 may need to be performed for each SPD bus for each DIMM, as needed or desired.

Figure 4:
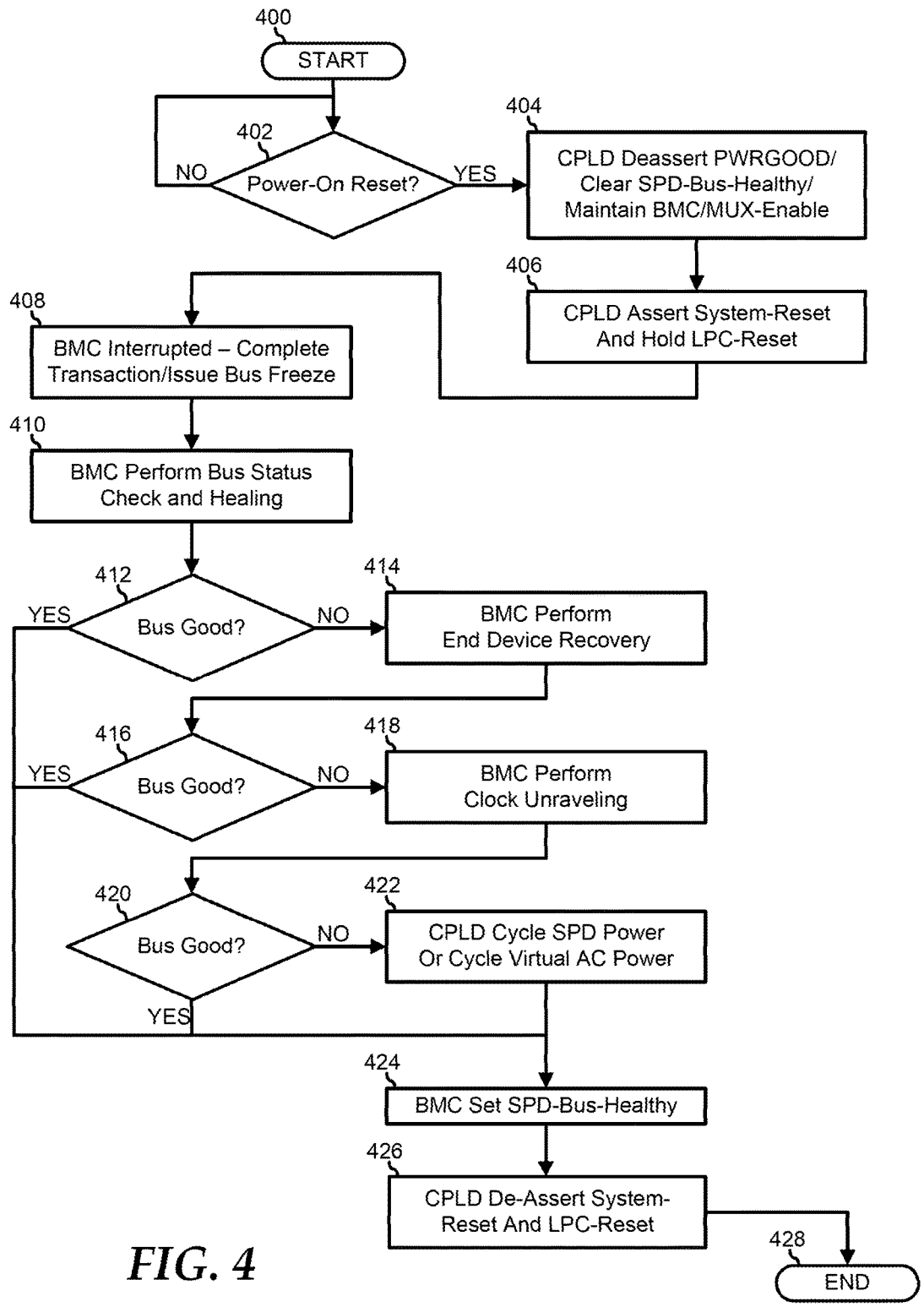
FIG. 4 is a flowchart illustrating a method for arbitration and recovery of SPD interfaces when an information handling system transitions from the S0 (working) state to the S0 (soft off) state according to an embodiment of the present disclosure.

FIG. 4 illustrates a method for arbitration and recovery of SPD interfaces when an information handling system transitions from the S5 state to the S0 state, beginning at block 400. A decision is made as to whether or not an information handling system has had a power-on request in decision block 302. If not, the "NO" branch of decision block 402 is taken, and the method loops back to the decision block until the information handling system has had a power-on request, and the "YES" branch of the decision block is taken, and the method proceeds to block 404. At block 404, a CPLD deasserts a PWRGOOD signal, clears a SPD-Bus-Healthy bit in a System Peripheral Interface (SPI), and a BMC/MUX-Enable signal is enabled to isolate a processor complex of the information handling system from the SPD mechanisms of the DIMMs and to switch a BMC of the information handling system to the SPD mechanisms. The CPLD asserts the system-reset signal and holds the LPC-reset signal to forestall the processor complex of the information handling system from taking control of the SPD mechanisms of the DIMMs in block 406. When the PWR-GOOD signal is asserted, the BMC is interrupted and the BMC completes in-flight SPD transactions and issues a SPD bus freeze command in block 408. At this time, based upon the assertion of the BMC/MUX-Enable signal, the BMC owns the I2C busses to the SPD mechanisms of the DIMMs and performs a status check and bus healing in block 408.

A decision is made as to whether or not a particular I2C bus is good in decision block 412. If so, the "YES" branch of decision block 412 is taken and the method proceeds to block 424, as described below. If not, the "NO" branch of decision block 412 is taken and the BMC performs an end-device recovery in block 414, for example, by asserting an SMBUS timeout by holding a clock signal low for longer than 35 ms, and the method proceeds to decision block 416 where the particular I2C bus is rechecked to determine whether or not the particular I2C bus is good. If so, the "YES" branch of decision block 416 is taken and the method proceeds to block 424, as described below. If not, the "NO" branch of decision block 416 is taken and the BMC performs a clock unravelling on the particular bus in block 418, for example by providing 27 clock cycles followed by a stop cycle, and the method proceeds to decision block 420 where the particular I2C bus is rechecked to determine whether or not the particular I2C bus is good. If so, the "YES" branch of decision block 420 is taken and the method proceeds to block 424, as described below. If not, the "NO" branch of decision block 420 is taken and the BMC requests the CPLD to cycle the SPD bus power or to perform a virtual AC Power cycle in block 422, and the method proceeds to block 424. When the particular bus is good, as determined by decision blocks 412, 416, and 420, or when the CPLD cycles the SPD bus power or provides the AC Power cycle in block 422, then the BMC sets the SPD-Bus-Healthy bit in the SPI in block 424, the CPLD de-asserts the system-reset and the LPC-Reset signals in block 426, and the method ends in block 428.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a Dual In-Line Memory Module (DIMM) including a Serial Presence Detect (SPD) and a slave Inter-Integrated Circuit (I2C) interface configured to provide communicative access to the SPD;
   a processor complex including a first master I2C interface selectively coupled to the slave I2C interface, the processor complex configured to communicate with the SPD during a system boot state;
   a Baseboard Management Controller (BMC) including a second master I2C interface selectively coupled to the slave I2C interface, the BMC configured to communicate with the SPD during a power-off state of the information handling system; and
   reset logic configured to:
      select the first master I2C interface to be coupled to the slave I2C interface during the system boot state;
      select the second master I2C interface to be coupled to the slave I2C interface during the power-off state;
      detect a transition between the power-off state and the system boot state; and
      delay the selection of the first master I2C interface to be coupled to the slave I2C interface until the BMC is finished communicating with the SPD.

2. The information handling system of claim 1, further comprising:
   a multiplexor configured to selectively couple the first master I2C interface to the slave I2C interface.

3. The information handling system of claim 2, further comprising:
   a switch configured to selectively couple the second master I2C interface to the slave I2C interface.

4. The information handling system of claim 3, wherein the reset logic includes an enable signal, wherein the enable signal operates to select the first master I2C interface to be coupled to the slave I2C interface when the enable signal is in a first state and to select the second master I2C interface select to be coupled to the slave I2C interface when the enable signal is in a second state.

5. The information handling system of claim 4, wherein the reset logic is further configured to: provide the enable signal in the first state during the system boot state; and provide the enable signal in the second state during the power-off state.

6. The information handling system of claim 1, wherein the reset logic is further configured to:

set a SPD-bus-healthy bit in a Serial Peripheral Interface (SPI) in response to detecting the transition between the power-off state and the system boot state.

7. The information handling system of claim 6, wherein the BMC is configured to:
 detect that the SPD-bus-health bit is set;
 perform a I2C bus status check in response to detecting that the SPD-bus-healthy bit is set; and
 clear the SPD-bus-healthy bit in response to the I2C bus status check.

8. The information handling system of claim 7, wherein the reset logic is further configured to: determine that the SPD-bus-healthy bit is cleared.

9. The information handling system of claim 8, wherein the reset logic determines that the BMC is finished communicating with the SPD based upon the determination that the SPD-bus-healthy bit is cleared.

10. A method, comprising:
 selecting, by reset logic of an information handling system, a first master Inter-Integrated Circuit (I2C) interface of a processor complex of the information handling system, to be coupled to a slave I2C interface of a Dual In-Line Memory Module (DIMM) of the information handling system during a system boot state of the information handling system, wherein the slave I2C interface is configure to provide communicative access to a Serial Presence Detect (SPD) of the DIMM;
 selecting, by the reset logic, a second master I2C interface of a Baseboard Management Controller (BMC) of the information handling system, to be coupled to the slave I2C interface during a power-off state of the information handling system;
 detecting, by the reset logic, a transition between the power-off state and the system boot state; and
 delaying, by the reset logic, the selection of the first master I2C interface to be coupled to the slave I2C interface until the BMC is finished communicating with the SPD.

11. The method of claim 10, wherein, in selecting the first master I2C interface to be couple to the slave I2C interface, the method further comprises:
 enabling, by the reset logic, a multiplexor configured to selectively couple the first master I2C interface to the slave I2C interface.

12. The method of claim 11, wherein, in selecting the second master I2C interface to be couple to the slave I2C interface, the method further comprises:
 enabling, by the reset logic, a switch configured to selectively couple the second master I2C interface to the slave I2C interface.

13. The method of claim 12, wherein the reset logic includes an enable signal, wherein:
 in enabling the multiplexor, the method further comprises providing, by the reset logic, the enable signal in a first state; and
 in enabling the switch, the method further comprises providing, by the reset logic, the enable signal in a second state.

14. The method of claim 13, further comprising:
 providing, by the reset logic, the enable signal output in the first state during the system boot process; and
 providing, by the reset logic, the enable signal output in the second state during the power-off state.

15. The method of claim 10, further comprising:
 setting, by the reset logic, a SPD-bus-healthy bit in a Serial Peripheral Interface (SPI) in response to detecting the transition between the power-off state and the system boot state.

16. The method of claim 15, further comprising:
 detecting, by the BMC, that the SPD-bus-health bit is set;
 performing, by the BMC, a I2C bus status check in response to detecting that the SPD-bus-healthy bit is set; and
 clearing, by the BMC, the SPD-bus-healthy bit in response to the I2C bus status check.

17. The method of claim 16, further comprising: determining, by the reset logic, that the SPD-bus-healthy bit is cleared.

18. The method of claim 17, wherein the reset logic determines that the BMC is finished communicating with the SPD based upon the determination that the SPD-bus-healthy bit is cleared.

19. Reset logic circuitry of an information handling system, comprising:
 an enable signal output; and
 reset logic hardware configured to:
  set the enable signal output to a first state to select a first master Inter-Integrated Circuit (I2C) interface of a processor complex of the information handling system, to be coupled to a slave I2C interface of a Dual In-Line Memory Module (DIMM) of the information handling system during a system boot state of the information handling system, wherein the slave I2C interface is configure to provide communicative access to a Serial Presence Detect (SPD) of the DIMM;
  set the enable signal output to a second state to select a second master I2C interface of a Baseboard Management Controller (BMC) of the information handling system, to be coupled to the slave I2C interface during a power-off state of the information handling system;
  detect a transition between the power-off state and the system boot state; and
  delay the selection of the first master I2C interface to be coupled to the slave I2C interface until the BMC is finished communicating with the SPD.

20. The reset logic circuitry of claim 19, wherein the reset logic hardware is further configured to: set a SPD-bus-healthy bit in a Serial Peripheral Interface (SPI) in response to detecting the transition between the power-off state and the system boot state; and determine that the SPD-bus-healthy bit is cleared, wherein the reset logic hardware determines that the BMC is finished communicating with the SPD based upon the determination that the SPD-bus-healthy bit is cleared.

* * * * *